Oct. 6, 1964  D. R. TALBOTT  3,151,463
METHOD AND APPARATUS FOR CONTROLLING AQUATIC WEED GROWTH
Filed March 28, 1962  2 Sheets-Sheet 2
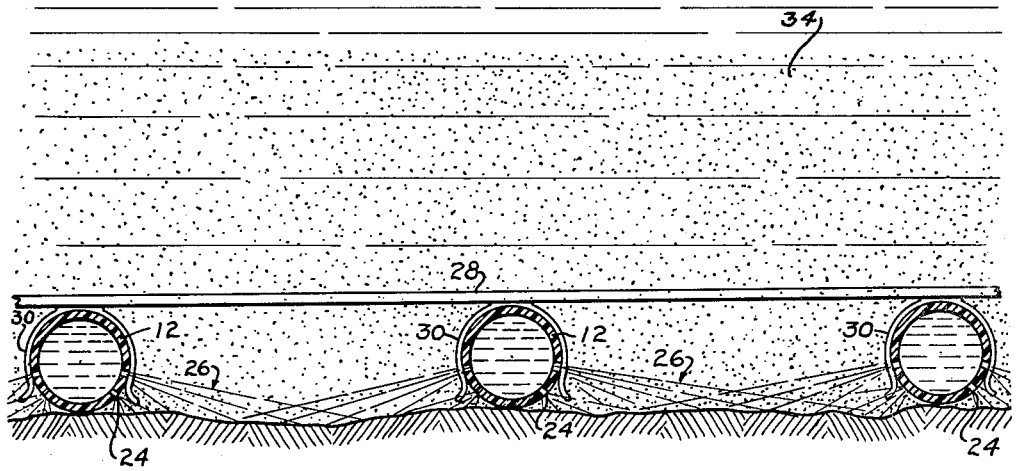
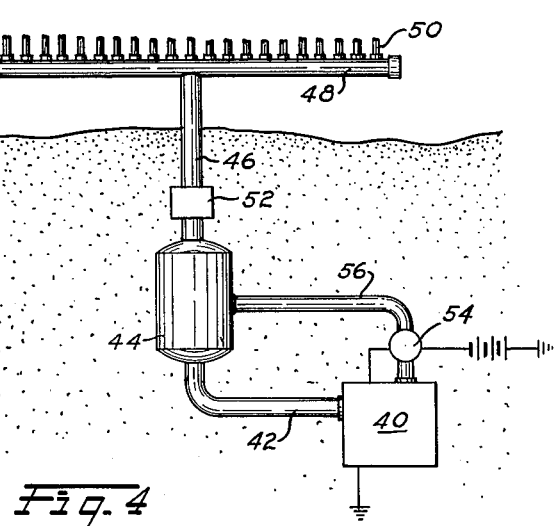
INVENTOR
DAVID R. TALBOTT
BY *Scrivener & Parker*
ATTORNEYS

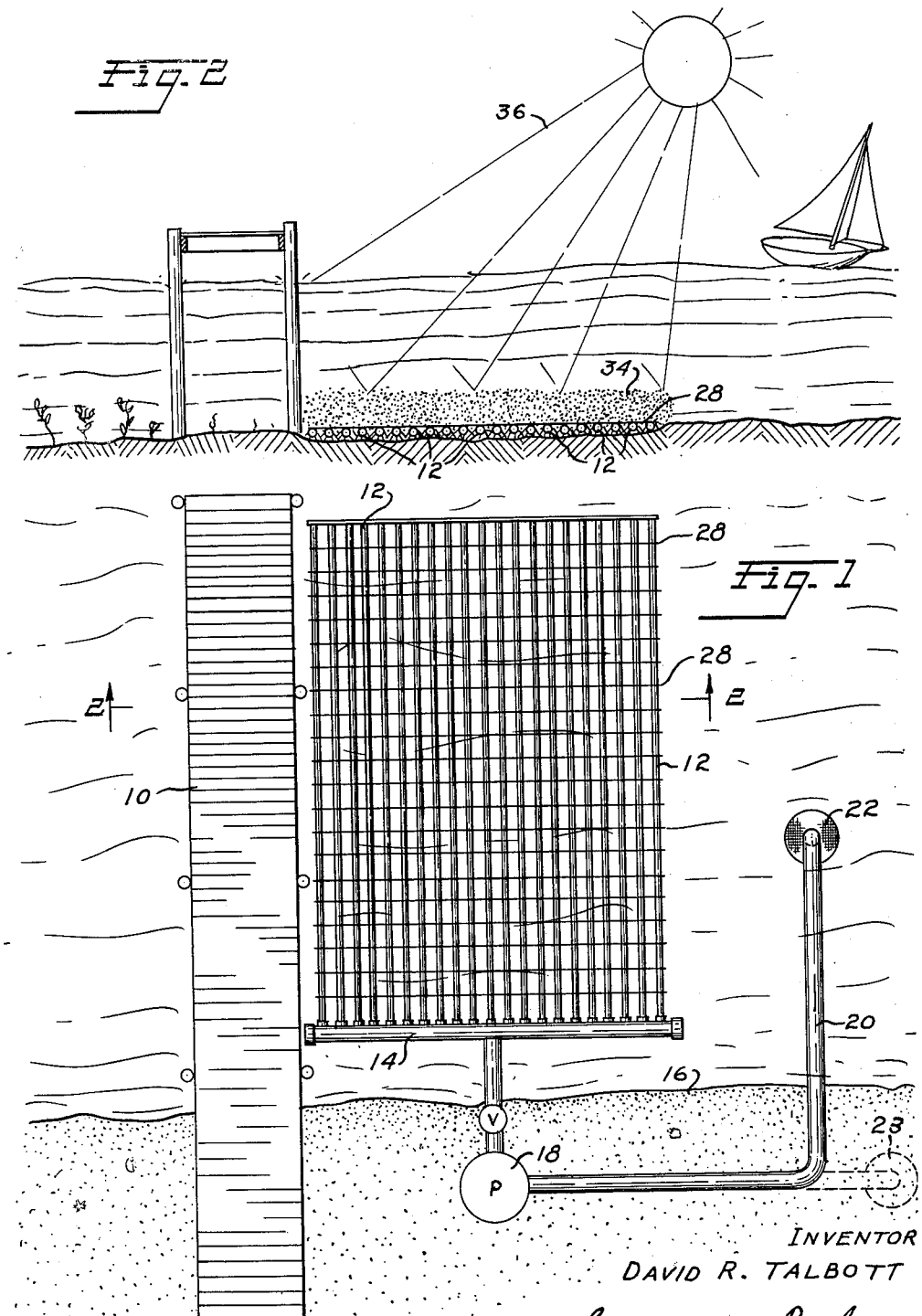

3,151,463
METHOD AND APPARATUS FOR CONTROLLING AQUATIC WEED GROWTH
David R. Talbott, 224 Westwood Road, Annapolis, Md.
Filed Mar. 28, 1962, Ser. No. 183,240
4 Claims. (Cl. 61—1)

This invention relates to aquatic weed control and more particularly to a method and apparatus for inhibiting or preventing the germination and growth of aquatic weeds in selected areas.

The marginal shorelines of many bays, tributaries and inland waters, particularly of the United States, support an annual type of aquatic weed which each year during the spring and early summer springs up from seeds or spores deposited on the bottom by the weed growth of the preceding year. During the fall and winter months the growth entirely disappears to reappear in the springtime, first as small seedlings which mature into a dense, matted almost inpenetrable blanket extending from the shoreline outwardly a distance of between approximately 25 and 200 feet depending upon the slope of the bottom.

Where the above mentioned belt or blanket or annual weed growth exists, as it does almost universally in certain areas, it is practically impossible for any use to be made of the riparian waters infested by the growth. Thus such waters cannot be used for swimming, boating, fishing and the like and it is a broad object of the present invention to provide a novel method and apparatus which inhibits or prevents the infestation by weed of selected areas normally rendered unusable because of weed growth.

The aquatic weed with which the present invention is concerned is, in common with substantially all vegetation, dependent upon sunlight for germination and growth though other factors, such as water temperature, are also essential elements. Where sunlight is shaded from a potential weed bed, the weed does not germinate even though all other factors of germination are favorable. Though it has been recognized that weed growth might be prevented by the use of some form of shading means over the weed bed, no practical means have been devised which can withstand prolonged submergence or will not interfere with the otherwise normal use of the waterfront. It is the object of the present invention to provide a method and apparatus which effects shading of selected bottom areas so as to prevent weed germination, or growth, without any of the disadvantages of other shading means which might conceivably be employed for such use.

More specifically, it is the object of the invention to accomplish the foregoing by a novel method and apparatus which effects disturbance or agitation of suspensionable bottom material in an area to be treated so as to cause the material to be placed in suspension in the waterway over the area and produce a shading cloud through which sunlight cannot penetrate in sufficient strength to permit the weed spores or seeds to germinate and grow.

Though one function of the method and apparatus of the invention is to produce the sunlight blocking cloud as mentioned in the foregoing paragraph another object of the invention is to utilize the bottom disturbing action to maintain in suspension weed spores and seeds so that by sunlight shading or by seed suspension or by a combination of both, germination is prevented in the area undergoing treatment.

Yet another object of the invention is to provide apparatus which, in addition to accomplishing the above objects, may also be utilized for distributing chemicals on weed in selected areas.

Other objects and their attendant advantages will become apparent as the following detailed description is read in conjunction with the accompanying drawings wherein:

FIG. 1 is a top plan view of a typical waterfront area showing a form of apparatus constructed in accordance with the invention and which may be utilized to treat a selected area in accordance with the method of the invention;

FIG. 2 is a vertical cross sectional view taken substantially on the line 2—2 of FIG. 1;

FIG. 3 is an enlarged vertical cross sectional view of apparatus constructed in accordance with the invention; and FIG. 4 is a broken plan view showing apparatus of another type which may be employed in accordance with the invention.

In accordance with the method of the invention germination of weed is prevented by the continued or intermittent disturbance or agitation of suspensionable bottom material of selected areas subject to weed growth during the period when the weed seeds normally germinate. This bottom disturbance prevents germination through one or the other of two agencies or through a combination of both; namely, the production of a suspended, sunlight shading cloud over the treatment area or the physical suspension of the weed seeds over the bottom.

FIGS. 1 through 3 illustrate a type of apparatus constructed in accordance with the invention for accomplishing the foregoing results. FIG. 1 illustrates a typical beach front where it may be desirable to retain an area on one side of a pier 10 free of weed so as to be suitable for swimming, for example. The apparatus illustrated comprises a series of flexible hoses 12 which may be arranged in spaced parallel relationship to extend outwardly from the shoreline a desired distance and have their inner ends connected to a manifold 14 running parallel to the beach 16 a distance equal to the width of the selected area from which weed is to be excluded. The manifold is supplied with water under pressure by way of a pump 18 whose suction side receives water by way of a conduit 20 whose outer end is connected to a suitable strainer 22 below the water's edge. If desired, the conduit 20 may be connected to a supply reservoir 23 containing chemical weed killer as indicated by the dotted lines.

With reference to FIG. 3 it will be seen that each of the hoses 12 is provided throughout its length with a plurality of downwardly and outwardly extending outlet orifices 24 which are so arranged that pressurized water within the hose is projected in a series of jets diagonally downwardly against the bottom as indicated at 26 in FIG. 3. The hoses 12 are so positioned and spaced with respect to each other that the jet streams of adjacent hoses overlap each other as indicated so that the entire area of the bottom is agitated. In order to anchor the hoses in their position of use with the orifices properly directed, a plurality of lateral metallic rods 28 may be provided having integrally connected thereto at spaced intervals corresponding to the desired spacing of the hoses a plurality of spring clips 30 which are adapted to frictionally clamp the hoses after their orifices have been properly oriented to produce the desired jet action against the bottom.

In operation, it will be observed in FIGS. 2 and 3 that when water under pressure is delivered by the pump 18 to the manifold 14 the water flows outwardly through the orifices 24 to impinge on the bottom thereby causing to be jetted into suspension bottom material to form a cloud 34 which will generally overlie the treatment area encompassed by the hoses. As illustrated in FIG. 2 this cloud will prevent the sun rays, indicated by the numeral 36, from reaching the bottom thereby excluding from the treatment area a necessary factor for seed germination or weed growth. In addition to producing the cloud 34, there will also be jetted into suspension still dormant weed seeds or spores thus preventing their coming into necessary contact with the bottom for germination and subsequent sprouting. In order to utilize the bottom disturbing action of the apparatus of the invention for the purpose of jetting seeds into suspension, it will be apparent that the bottom area should be treated early enough in the spring so that the seeds or seedlings have not obtained a secure rooting in the bottom. In the event that a dense growth has accumulated before the commencement of treatment, it may be desirable to apply chemical weed killer to the growth by connecting the pump 18 to the weed killer supply 23. It should be understood that the weed killer may be metered by means of a conventional venturi (not shown) between the pump and strainer 22.

The apparatus disclosed in FIG. 4 differs from that of FIG. 1 in that the former contemplates the use of pneumatic pressure for producing substantially the same results as the apparatus of FIG. 1. The advantage of pneumatic pressure as opposed to water pressure is the fact that air pressure is susceptible of being stored in a suitable reservoir to be metered outwardly at a steady or intermittent rate as necessary to accomplish the desired results. It will thus be apparent that the compressor supplying the reservoir need only operate for short periods of time sufficient to supply the reservoir with pressure between predetermined high and low values.

In FIG. 4 the numeral 40 designates a compressor having delivery conduit 42 connected to a reservoir 44. The reservoir 44 is provided with an outlet conduit 46 leading to a manifold 48 to which there are connected the inner ends of hoses 50 which may correspond generally to the hoses 12 illustrated in FIG. 1. Desirably, there is provided in the conduit 46 a metering valve 52 which may be of the constant flow type or an automatic intermittent type whereby in the latter instance, pulses of pressurized air are admitted to the manifold 48 and hoses 50. The compressor 40 may be controlled by a conventional electro-pneumatic switch 54 responsive to reservoir pressure by way of a control conduit 56. It is believed that the operation of the compressor and storage system of FIG. 4 is sufficiently well known to those skilled in the art that a detailed description thereof is not required, it being sufficient to say that pressurized air passing through the metering valve flows through the hoses and outlet orifices in FIG. 3 in the same fashion as the previously described water pressure to produce substantially the same results.

Intermittent operation of the arrangment of FIG. 1, similar to the pneumatic system of FIG. 4, can be obtained if desirable or necessary by the use of a water tank having a trapped air head which may be intermittently pressurized in a manner similar to household water pressure systems which are supplied from individual wells, in which event the system would be arranged substantially as the pneumatic system shown in FIG. 4, except that the compressor 40 would correspond to the pump 18 and would include an intake conduit similar to conduit 20.

The invention is by no means limited to the particular arrangement of hoses illustrated in the drawings inasmuch as the results of the invention will be achieved with any hose or other conduit arrangement, such as for example a network of hoses or pipes, or a single hose which is arranged spirally to cover the area which it is desired to treat. Furthermore, the means illustrated for anchoring and positioning the hoses is representative only since obviously other suitable means may be employed.

In lakes and in sheltered tidal tributaries, current flow is negligible so that a suspended cloud of bottom material can be maintained over the treatment area without difficulties throughout the daylight periods. In areas where relatively significant current flow exists, the apparatus can be retained in operation throughout the germinating period so that seed jetted into suspension is carried by the current away from the treatment area. The supply of additional seed flowing over the area from upstream will be progressively decreased as that seed takes root in the normal manner in spaces outside of the treatment area. Thus it will be apparent that the apparatus and method of the invention is as advantageous in areas where there is no current flow as in areas where the current is significant.

Though the apparatus of the invention may be installed substantially permanently in the treatment area, it is contemplated that the apparatus will be portable and will be located in the treatment area for only such length of time as is necessary to insure non-germination of the weed. This can usually be determined by observing the weed growth in untreated areas and when it is apparent that the weed growth outside of the treatment area has grown to a substantial size, operations can be terminated and the apparatus removed. Experiments have established that where established weed growth has been removed by jet action so that the weed roots are disconnected entirely from the bottom (see the patents to Talbott and Darden, Nos. 2,852,868 and 3,019,535 for apparatus for accomplishing the foregoing) there is no further or later germination of weed seeds or weed growth so that once treated by the method of the invention an area remains clear of weed throughout the remainder of the season.

From the foregoing description, it will be apparent that the apparatus of the invention is susceptible of variety of changes and modification without however departing from the scope and spirit of the intended claim.

What is claimed is:

1. The method of preventing the germination and growth of aquatic weeds in selected areas of waterways whose bottoms are composed of material subject to weed growth and suspensionable upon agitation thereof comprising agitating said bottom material in each of said areas until a suspended sunlight shading cloud of bottom material substantially overlies the entire area and continuing the agitation to maintain said cloud over said area until the period of weed germination and growth has elapsed.

2. The method of claim 1 wherein the agitation is afforded by subjecting said bottom material to a plurality of fluid pressure jets projected against the bottom and distributed uniformly over said area.

3. The method of claim 2 wherein said jets are afforded by water pressure.

4. The method of claim 2 wherein said jets are afforded by air pressure.

References Cited in the file of this patent

FOREIGN PATENTS

| | | |
|---|---|---|
| 15,317 | Great Britain | Nov. 24, 1886 |
| 309,121 | Italy | June 26, 1933 |

OTHER REFERENCES

Municipal Utilities (publication), April 1953, pages 97 and 98.